US012568885B2

(12) United States Patent
Kuhlenkamp

(10) Patent No.: US 12,568,885 B2
(45) Date of Patent: Mar. 10, 2026

(54) AGRICULTURAL MOUNTED IMPLEMENT WITH CLEANING UNIT

(71) Applicant: August Kuhlenkamp, Paderborn (DE)

(72) Inventor: August Kuhlenkamp, Paderborn (DE)

( * ) Notice: Subject to any disclaimer, the term of this patent is extended or adjusted under 35 U.S.C. 154(b) by 361 days.

(21) Appl. No.: 18/210,713

(22) Filed: Jun. 16, 2023

(65) Prior Publication Data

US 2023/0329150 A1      Oct. 19, 2023

Related U.S. Application Data

(63) Continuation of application No. PCT/DE2021/100995, filed on Dec. 10, 2021.

(30) Foreign Application Priority Data

Dec. 18, 2020    (DE) ..................... 20 2020 107 384.2

(51) Int. Cl.
    *A01D 57/30*        (2006.01)
    *A01D 51/00*        (2006.01)
    (Continued)
(52) U.S. Cl.
    CPC ........... *A01D 57/30* (2013.01); *A01D 89/006*
       (2013.01); *A01D 51/00* (2013.01); *A01D 84/00*
                                            (2013.01)
(58) Field of Classification Search
    CPC .... A01D 51/00–51/007; A01D 89/00–89/008;
                                            A01D 75/187;
    (Continued)

(56) References Cited

U.S. PATENT DOCUMENTS

| | | | | |
|---|---|---|---|---|
| 3,178,876 A | * | 4/1965 | Lundberg | ............... A01D 57/30 |
| | | | | 56/DIG. 1 |
| 3,673,774 A | * | 7/1972 | Mizzi | .................... A01D 45/10 |
| | | | | 56/60 |

(Continued)

FOREIGN PATENT DOCUMENTS

| DE | 3615172 A1 | 11/1987 |
|---|---|---|
| DE | 102019000229 A1 | 7/2019 |

(Continued)

OTHER PUBLICATIONS

International Search Report dated Mar. 11, 2022 in corresponding application PCT/DE2021/100995.

(Continued)

*Primary Examiner* — Joseph M Rocca
*Assistant Examiner* — Madeline I Runco
(74) *Attorney, Agent, or Firm* — Muncy, Geissler, Olds & Lowe, P.C.

(57)          ABSTRACT

An agricultural mounted implement for the cleaning of harvested material, which cleaning is mobile and operated on a vehicle, said implement having an implement frame, a fan, and a cleaning unit. The cleaning unit has a pick-up for picking the harvested material to be cleaned; a first air distributor base connected to the fan via an air conveying channel and has a first air passage; a conveyor unit via which the cleaned harvested material is ejected from the cleaning unit; and a drop sieve which is mounted on the implement frame so as to be congruently below the conveyor unit. During operation, the fan sucks in an air flow, guides it under the first air distributor base and blows it out through the first air passage counter to the force of gravity such that the harvested material picked by the pick-up is transported to the conveyor unit.

20 Claims, 4 Drawing Sheets

(51) Int. Cl.
    *A01D 84/00*       (2006.01)
    *A01D 89/00*       (2006.01)

(58) Field of Classification Search
    CPC ...... A01D 57/30; A01D 17/02; A01D 33/105;
                                        A01D 84/00
    See application file for complete search history.

(56)                    References Cited

U.S. PATENT DOCUMENTS

| | | | |
|---|---|---|---|
| 4,364,222 | A | 12/1982 | Ramacher |
| 5,387,155 | A * | 2/1995 | Dietz .................... A01D 17/06 |
| | | | 171/58 |
| 6,500,062 | B1 | 12/2002 | Harris et al. |
| 8,286,798 | B2 * | 10/2012 | Ricketts ............... A01D 45/028 |
| | | | 460/44 |
| 2010/0000194 | A1 * | 1/2010 | Meester ............... A01D 45/006 |
| | | | 56/327.1 |
| 2020/0298289 | A1 * | 9/2020 | Cauthen .................... B07B 4/02 |
| 2022/0071094 | A1 * | 3/2022 | Monchiero .......... A01D 51/002 |

FOREIGN PATENT DOCUMENTS

| | | | | |
|---|---|---|---|---|
| EP | 3058805 | A1 | 8/2016 | |
| WO | WO9933580 | A1 | 7/1999 | |
| WO | WO-2013091885 | A2 * | 6/2023 | ........... A01D 51/005 |

OTHER PUBLICATIONS

International Preliminary Report on Patentability dated Jun. 29, 2023 in corresponding application PCT/DE2021/100995.

\* cited by examiner

AGRICULTURAL MOUNTED IMPLEMENT WITH CLEANING UNIT

This nonprovisional application is a continuation of International Application No. PCT/DE2021/100995, which was filed on Dec. 10, 2021, and which claims priority to German Patent Application No. 20 2020 107 384.2, which was filed in Germany on Dec. 18, 2020, and which are both herein incorporated by reference.

BACKGROUND OF THE INVENTION

Field of the Invention

The present invention relates to an agricultural mounted implement for mobile cleaning of crops, in particular stalks, performed on an agricultural vehicle.

Description of the Background Art

It is a common task in agriculture that crops or stalks are to be picked up after mowing and cleaned of foreign particles before being used as fodder or bedding. Various foreign particles such as raw ash (earth), sand, stones, wood or the like may be contained in the crop. These foreign particles have no nutritional value, reduce the suitability of the crop for ensiling, and lead to increased machine wear. In addition, foreign particles such as metal parts, wood or glass splinters or the like can injure animals.

The crop referred to in the present invention is a crop which has been mown in an area and is lying on the mown area. The mowing and the picking up and cleaning of the crop may in principle be carried out in a joint operation or take place in consecutive operations. In the context of the invention, stalks are understood to mean stalk-like biomass. These include, in particular, straw as well as grassland or hay plants, such as grasses, herbs or legumes, which can be used as food or as fodder or silage or as bedding for pets or farm animals.

For picking up the crop, a large number of agricultural mounted implements are known. Agricultural mounted implements of this type are usually coupled to a front or rear lifting mechanism of a vehicle, in particular a tractor, a Unimog or a similar off-road vehicle. The agricultural mounted implements are operated in a mobile manner via an auxiliary drive, usually a PTO shaft, of the vehicle.

DE 10 2019 000 229 A1 sets out a mobile agricultural mounted implement that can be operated on a vehicle for gathering crops (swaths). To pick up the crop, the mounted implement comprises a rotating pickup unit having axially protruding tines, known as a pickup, a conveyor belt arranged behind the pickup in terms of the direction of travel of the vehicle and rotating transverse to the direction of travel, and one or more suction fans. The crop picked up by the pickup is sucked onto the conveyor belt by means of at least one suction fan and ejected on an ejection side of the mounted implement, being deposited on the ground as evenly lined swaths.

EP 3 058 805 B1 sets out an alternative agricultural mounted implement for raking or gathering crops, the crop being conveyed transversely by a rotationally driven conveyor screw, which has a horizontal longitudinal extension transverse to the direction of travel of the vehicle, instead of by the conveyor belt.

In spite of being lifted from the ground by the pickup, the crop swathed in this way may contain a high proportion of foreign particles, such as raw ash, sand or small stones, in such a way that a downstream cleaning process is required so as to be able to use the crop as bedding or animal feed of a sufficient quality. At present, however, there are no mass-produced agricultural mounted implements available on the crop cleaning market.

SUMMARY OF THE INVENTION

It is therefore an object of the present invention to provide an agricultural mounted implement of the generic type in such a way that crops, in particular stalks, are cleaned in a mobile manner with a high degree of cleaning and with improved economic efficiency. In particular, the agricultural mounted implement according to the invention should enable efficient cleaning of crops for animal feed and bedding material. As a result of new guidelines on animal welfare, stables will increasingly be coated with straw and litter in the future.

The mounted implement can have a mounting frame which can be coupled in a height-adjustable manner to a front and/or rear lifting mechanism of the vehicle and which is supported on the lifting mechanism and/or on wheels standing on the ground, a fan held on the mounting frame, and a cleaning unit held on the mounting frame. The cleaning unit can comprises: a pickup for picking up the crop to be cleaned, having a drum which, during operation, has a longitudinal extension transverse to the direction of travel of the vehicle and rotates counter to the direction of travel, and which has a plurality of radially protruding tines held in an axially distributed manner, a first air distribution tray which comprises a first air passage and which, during operation, is held on the mounting frame behind the receiving unit in the direction of travel and connected to the fan via an air duct, a conveyor unit which, during operation, is held on the mounting frame behind the first air distribution tray in the direction of travel, and which conveys transverse to the direction of travel, and via which the crop can be ejected from the cleaning unit towards an ejection side, and a drop sieve held congruently under the conveyor unit on the mounting frame.

During operation, an airflow is sucked in by the fan, passed under the first air distribution tray, and blown out counter to gravity through the first air passage in such a way that the crop picked up by the pickup is transported onwards to the conveyor unit. During operation, the pickup and conveyor unit of the cleaning unit and the fan are driven by an auxiliary drive of the vehicle.

Baffles are preferably held on the mounting frame, and prevent the crop from being blown out into the environment by the airflow or deflect the crop accelerated by the airflow in such a way that it engages in the conveyor unit. An advantageous position for a deflector plate is, for example, on a rear face of the cleaning unit, said face being positioned opposite the pickup and behind the conveyor unit. In this context, the deflector plate is configured for example as a rear wall.

The direction of rotation of the rotating components is in each case based on their upper halves, proceeding from a rotational shaft. This means that when the upper halves of the rotating components are moved away from the direction of travel, the rotation occurs counter to the direction of travel. The rotation occurs in the direction of travel when the upper halves of the rotating components are moved in the direction of travel.

An advantage of the invention is that the crop picked up by the pickup can be cleaned of foreign particles such as raw ash, soil, stones and the like gently, above the ground, by the airflow blown out through the air passages and by the drop sieve below the conveyor unit, the components being driven via the auxiliary drive of the vehicle. Advantageously, the mounted implement according to the invention is highly economical because it is of a structurally simple and compact construction.

The tines of the pickup can be arranged in several radially evenly distributed rows of tines. During operation, they are preferably close to the ground, in other words kept a few centimetres above the ground, in such a way that as little raw ash as possible is picked up together with the crop to be cleaned and at the same time an economical working speed can be achieved. During operation, the tines convey the crop to be cleaned upwards to the first air distribution tray.

The airflow sucked in by the fan and blown through the first air passage from below via the air duct blows dust-like or light foreign particles, such as grass pollen or blossoms, into the environment and transports the crop onwards to the conveyor unit. This conveys the crop to the ejection side transverse to the direction of travel of the vehicle, foreign particles such as raw ash and sand, wild herbs or weeds, and also in particular broken grain and other trimmings if the crop is straw, being filtered out via the drop sieve arranged below. Likewise, insects carried along as foreign particles can fall through the drop sieve during cleaning and advantageously escape alive.

The foreign particles filtered out via the air distribution tray and the drop sieve are preferably collected in a bunker arranged below the drop sieve or air distribution tray. This prevents the foreign particles from falling back onto the ground. In organic farming in particular, this prevents wild herb or weed seeds or the like from falling onto the ground and being able to sprout.

The crop cleaned in this way exits the ejection side of the cleaning unit, preferably as a swath on the ground. The foreign particle content in the cleaned crop is low enough that the crop can be collected and further processed as fodder or bedding without further cleaning processes.

The drum of the pickup, the first air distribution tray and the conveyor unit are preferably of approximately the same length and orientated mutually parallel. As a result, the cleaning unit can be formed particularly compact.

In an example, for coupling to a three-point power lift as the lifting mechanism of the vehicle, two lower links, held together in a fork shape at the same height, and an upper link, held centrally above the lower links, are held on the mounting frame. The links have two or more vertically distributed, horizontally orientated through-holes for passing a connector through, in such a way that they can be adapted to the lifting mechanism of the vehicle by stepwise vertical adjustment. Conventional connectors, for example shafts or bolts orientated transverse to the direction of travel, can be passed through the through-holes in the links. The links preferably have recesses, in which catch hooks can engage at suspension points of the lifting mechanism. Alternatively, auxiliary connectors can be adapted to the links, for example for connection to a quick coupling triangle of the lifting mechanism.

In a development of the invention, the cleaning unit can comprise a distributor, which is held above the pickup and at a height between a drum axis of the drum of the pickup and the first air passage, and which has a shaft which rotates counter to the drum of the pickup and has distributor tines protruding radially therefrom and arranged in an axially distributed manner, and which, in use, is powered by the auxiliary drive of the vehicle. The distributor, which is driven in rotation and also in part by the airflow blown out of the air passage arranged underneath, therefore acts as a material accelerator for the crop picked up by the pickup and whirled up by the airflow, and conveys it onwards to the conveyor unit.

In a development of the invention, the conveyor unit is a belt rake. A belt rake can refer to a conveyor belt driven in rotation transverse to the direction of travel of the vehicle or a conveyor chain driven in rotation and having tines projecting radially and tangentially therefrom. The conveyor belt or conveyor chain is passed continuously around at least two rollers, at least one roller being driven during operation. An advantage of the belt rake is its comparatively low mass and its simple integration into the cleaning unit, meaning that there is no need for expensive storage. The belt rake is held at a distance above the drop sieve in such a way that its rotating tines scrape the crop lying on the drop sieve towards the ejection side. A vertical height difference between the drop sieve and the tines of the belt rake can preferably be adjusted.

The conveyor unit can be a conveyor screw. During operation, the conveyor screw has a horizontal longitudinal extension transverse to the direction of travel of the vehicle and is driven in rotation via the auxiliary drive of the vehicle. It has a core and a helical thread which, when rotating during operation, conveys the crop out of the mounted implement towards the ejection side. The core ensures that the crop does not wrap itself around the conveyor screw. Advantageously, particularly elongate stalks can be broken and shortened when they engage in the conveyor screw.

The conveyor screw can be mounted on a first screw end opposite the ejection side of the cleaning unit and cantilevered on a second screw end opening into the ejection side. As a result, the conveyor screw is configured to be open at the end on the ejection side and can eject the crop being conveyed along a longitudinal extension direction of the conveyor screw transverse to the direction of travel of the vehicle.

The cleaning unit can comprise two or more mutually parallel conveyor units. Between the conveyor units, a further distributor rotating counter to the pickup is preferably held above the conveyor units on the mounting frame. At least one further air distribution tray, connected to the fan via the air duct and having a further air passage, is preferably provided between the conveyor units in such a way that during operation part of the airflow is blown out through the further air passage. It is thus advantageously possible to convey a large amount of crop transverse to the direction of travel simultaneously, in other words with parallel operation of the conveyor units arranged parallel side by side, and to clean it of foreign particles via the drop sieves provided under the conveyor units. As a result, an increased working speed and thus greater economic efficiency of the mounted implement according to the invention can be achieved. It may further be provided that the conveyor screws can each be switched on and/or off individually, depending on the need for conveying capacity, or can be coupled to and/or uncoupled from the power transmission operatively connected to the auxiliary drive of the vehicle.

A plurality of first air passages can be provided in the first air passage tray or a plurality of further air passages are provided in the further air passage tray. The air passages are preferably distributed uniformly over a width of the conveyor unit in the air passage trays. They are opened in such a way that, during operation, the airflow can flow out diagonally, counter to gravity and to the direction of travel of the vehicle.

The drop sieve can be channel-shaped and shaped in a manner corresponding to the conveyor unit or formed with a finer sieve or finer mesh proceeding towards the ejection side. If the conveyor unit is configured as a conveyor screw, the drop sieve has a correspondingly curved cross section. If the conveyor unit is configured as a belt rake, the drop sieve has a correspondingly shaped, substantially U-shaped cross section. A height difference between the conveyor unit and the drop sieve is preferably adjustable, and may be configured constant or variable over the course of the longitudinal extension of the conveyor unit.

The wheels of the mounting frame can be held on the mounting frame so as to be height-adjustable or pivotable about a vertically orientated axis. In any case, the front wheels in the direction of travel of the vehicle during operation are preferably configured as jockey wheels or supported by additional jockey wheels, in such a way that uneven ground can be compensated for during operation and the tines of the pickup are prevented from raking into the ground. The height may for example be adjusted in a structurally simple manner by means of a vertically orientated adjusting screw which is passed through the mounting frame, in conjunction with screw nuts.

The mounted implement can be coupled to a rear lifting mechanism of the vehicle, or two cleaning units are included. This results in an increased working width and working speed and thus increased economic efficiency for the operation of the agricultural mounted implement according to the invention.

The cleaning units can be held pivotably on the mounting frame by means of a telescopic or pivotable extension arm, in such a way that the drum of the pickup and the conveyor unit are pivoted out into an operating position transverse to the direction of travel during operation and pivoted into a non-operating position parallel to the direction of travel during non-operation. The pivoting preferably takes place via an adjustment element, which is held between the extension arm and the mounting frame, can be actuated from the vehicle and is driven by the auxiliary drive. The adjustment element is preferably configured as a hydraulic cylinder, which is operated via a hydraulic pump operated by the auxiliary drive of the vehicle.

The cleaning units may be held flush on the mounting frame, at the same level in the direction of travel of the vehicle, or mutually offset. Each cleaning unit may have its own fan and air duct assigned to it, or a central fan may be jointly assigned to the cleaning units, the air duct being formed with two strands in portions, in such a way that the air is distributed to both cleaning units.

The conveyor units of the cleaning units can be driven counter to one another during operation, and the ejection sides of the cleaning units are preferably at the same distances from a longitudinal centre of the vehicle, in such a way that the cleaned crop is preferably ejected at the level of the longitudinal centre of the vehicle. The cleaned crop is thus advantageously deposited on the ground as a swath, which is easy to collect.

Two free-clearing rotors can have a vertically orientated rotor axis and vertically orientated rotor tines, which are close to the ground during operation, are held on the mounting frame. During operation, the free-clearing rotors are arranged in front of the pickup and flush with the rear wheels of the vehicle in the direction of travel. They are driven in a counter-rotating manner via the auxiliary drive of the vehicle, in such a way that crop passed over by the vehicle is brought in front of the pickups of the cleaning units transverse to the direction of travel in each case.

Advantageously, crop that has been flattened by the vehicle can also be picked up and is already crudely pre-cleaned by the raking free-clearing rotors.

A distributor gear held on the mounting frame can be included, and is connected to the auxiliary drive of the vehicle by means of a cardan shaft. An output torque of the distributor gear is distributed via a power transmission, which are preferably configured as belts, belt pulleys, chains, gearwheels or additional gears, to the components of the mounted implement which are to be driven. The force or torque distribution for the components of the mounted implement which are to be driven is thus implemented in a structurally simple and cost-effective manner.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
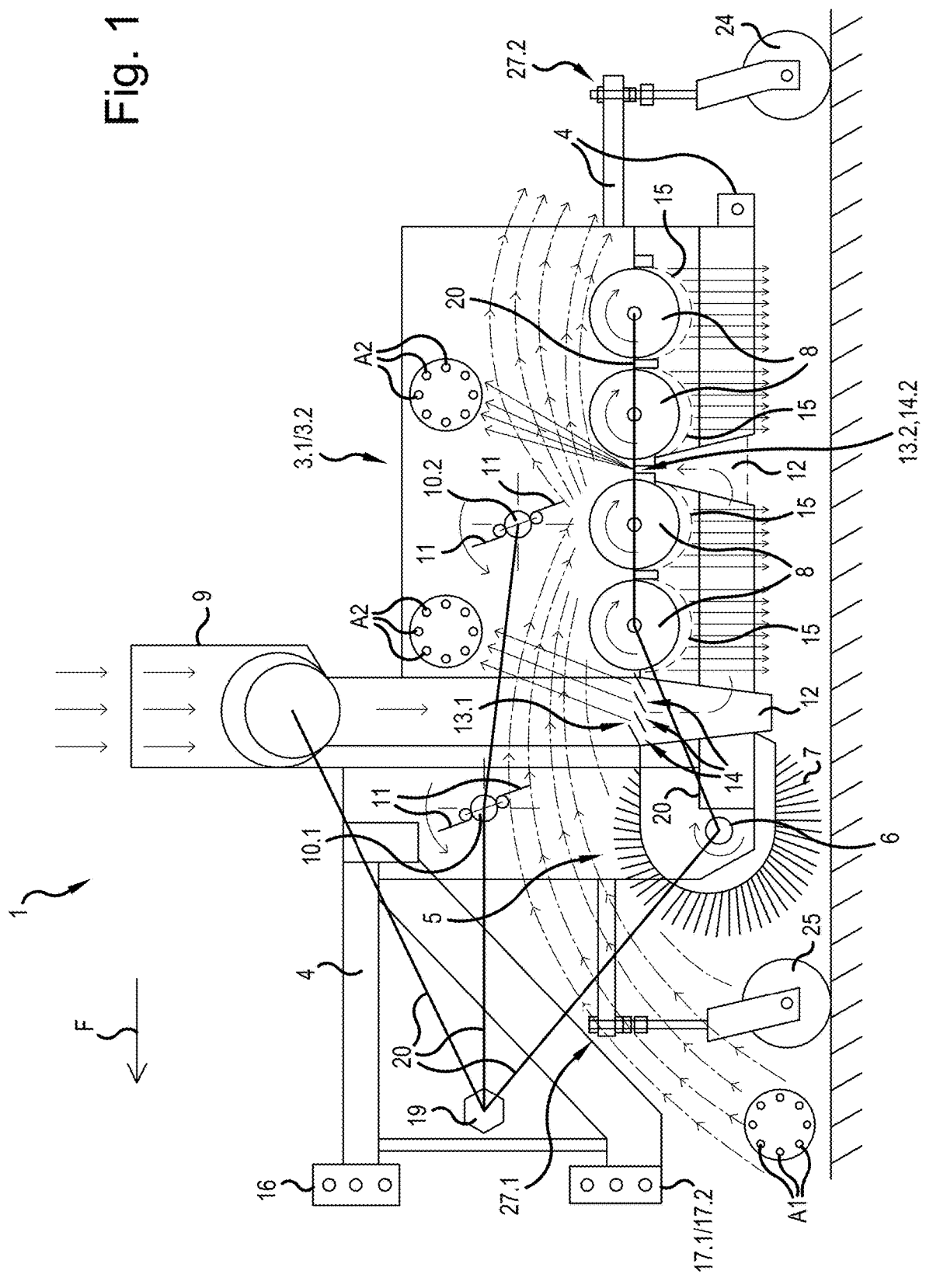
FIG. 1 is a schematic, lateral individual view of an example of an agricultural mounted implement according to the invention.

FIG. 1 to 6 below show examples of an agricultural mounted implement 1 according to the invention. The mounted implement 1 is configured to gather and clean crop A1, in particular crop such as straw or grassland plants for use as bedding or fodder.

The mounted implement 1 is operated in a mobile manner, in other words while coupled to the front or rear of a vehicle 2, such as in particular a tractor or a comparable off-road vehicle 2. The functional components to be driven, described below, are driven during operation via an auxiliary drive 19, usually an auxiliary drive shaft of the vehicle 2. The power or torque is transmitted within the mounted implement 1 by means of a distributor gear, to which a power transmission 20 is connected, which are preferably configured as belts and belt pulleys or as chains and gears. The force or torque is transmitted from the auxiliary drive 19 of the vehicle 2 to the distributor gear by means of a cardan shaft or the like, not shown in the drawings. In the drawings, the power transmission 20 are shown schematically as black lines, and the auxiliary drive 19 of the vehicle 2 is shown schematically as a prism. Alternatively, the mounted implement 1 according to the invention may also have on-board hydraulics comprising hydraulic drives, or on-board electronics comprising electric drives, or a controller which can be actuated or supplied with energy from the coupled vehicle 2.

The crop A1 to be cleaned or the cleaned crop A3 and foreign particles, in particular dust A2, are drawn in schematically in the form of circles in each of FIG. 1 to 6. The crop A1 to be cleaned is shown therein as an unfilled circle, the cleaned crop A3 as a rectangle and the foreign particles or dust A2 as a filled circle.

FIG. 1 is a simplified, schematic individual side view of a first exemplary embodiment of the agricultural mounted implement 1 according to the invention. The mounted implement 1 comprises a mounting frame 4 supported on two front wheels 25 and two rear wheels 24, having two lower links 17.1, 17.2 and an upper link 16 held centrally above them for coupling in a raisable and lowerable manner to a three-point power lift (lifting mechanism) of the vehicle 2, a fan 9 held on the mounting frame 4 and a cleaning unit 3.1, 3.2 held on the mounting frame 4 for cleaning the crop A1. The wheels 24, 25 are each fixed on the mounting frame 4 in a height-adjustable manner via a height adjustment system 27.1, 27.2. The height adjustment system 27.1, 27.2 is formed by way of a vertically orientated adjusting screw, which is passed through the mounting frame 4 and interacts with screw nuts at the top and bottom.

The cleaning unit 3.1, 3.2 initially has a pickup 5 for receiving the crop A1 to be cleaned. Said pickup is formed from a horizontally elongate, rotatably mounted drum 6 which, during operation, rotates counter to the direction of travel F of the vehicle 2. Axially distributed tines 7 are held on the drum 6 and protrude radially from the drum 6. During operation, the tines 7 are close to the ground, in other words held a few centimeters above the ground, in such a way that they rake up the crop A1 to be cleaned from the ground without themselves protruding into the ground.

A first air distribution tray 13.1, onto which the crop A1 to be cleaned which has been collected by the pickup 5 is transported upwards, is arranged behind the pickup 5 in the direction of travel F of the vehicle 2. A plurality of air passages 14 are formed in the first air distribution tray 13.1. An air duct 12 ends at the underside of the first air distribution tray 13.1, and at its opposite end is connected to the fan 9. During operation, the fan 9 draws in an airflow from the environment of the mounted implement 1, which is directed under the first air duct tray 13.1 via the air duct 12 and is blown out through the air passages 14. The airflow is diagonally counter to the force of gravity and to the direction of travel F of the vehicle 2, and blows the crop A1 to be cleaned which has been picked up to engage in a conveyor unit of the cleaning unit 3.1, 3.2. This airflow is adapted to a specific weight of the crop A1 in such a way that foreign particles having a higher specific density than the crop A1, for example stones or metal or wood particles, are not transported onwards by the airflow, and fall through a gap formed between the pickup 5 and the first air distribution tray 13.1. In the event that foreign particles fall through the air passages 14 into the air duct 12, they can be removed via a ground slide. On the other hand, foreign particles having a lower specific density than the crop A1, in particular dust A2, are sufficiently accelerated by the airflow that they are transported out of the cleaning unit 3.1, 3.2 into the environment.

A first distributor 10.1 is further provided above the pickup 5, and serves as a material accelerator for the crop A1 to be cleaned and accelerates it in the direction of a conveyor unit of the cleaning unit 3.1, 3.2, which is provided behind the first air distribution tray 13.1 in the direction from the pickup. The first distributor 10.1 has a horizontally orientated shaft which, during operation, is driven counter to the drum 6 of the pickup 5 by the auxiliary drive 19 of the vehicle 2. Distributing tines 11 arranged in an axially distributed manner protrude radially from the shaft.

In the exemplary embodiment of the agricultural mounted implement 1 according to FIG. 1, the conveyor unit of the cleaning unit 3.1, 3.2 is formed by four conveyor screws 8. The conveyor screws 8 are horizontally elongate and are held mutually parallel at the same height on the mounting frame 4. During operation, the conveyor screws 8 are driven in rotation via the auxiliary drive 19 of the vehicle 2 in such a way that they convey the crop A1 to be cleaned transverse to the direction of travel F of the vehicle 2 towards the ejection side 29 of the cleaning unit 3.1, 3.2. The airflow is indicated schematically in FIG. 1 by simple directional arrows. A conveying direction of the crop A1 to be cleaned is indicated schematically by broken curved lines having directional arrows.

A correspondingly shaped, channel-shaped drop sieve 15 is held on the mounting frame 4 below the conveyor screws 8. For example, the drop sieve 15 may be configured as a perforated channel. The hole diameters of the drop sieve 15 are selected in such a way that, during operation, the crop A1 transported in the conveyor screws 8 remains above the perforated sieve 15 and foreign particles adhering to the crop A1 are sieved out by the drop sieve 15. This is indicated in the drawing by directional arrows coming from the drop sieves 15 and directed towards the ground.

The exemplary embodiment of the agricultural mounted implement 1 according to FIG. 1 provides that a further distributor 10.2 is provided above the second conveyor screw 8 as viewed from the pickup 5, and is configured analogously to the first distributor 10.1 as a material accelerator for the crop A1 to be cleaned and, as is conventional, has the horizontally revolving shaft having radially projecting distributor tines 11. The further distributor 10.2 is used to transport a portion of the crop A1 to be cleaned, which is accelerated by the airflow flowing out of the air passages 14 of the first air distribution tray 13.1, to the third and fourth conveyor screw 8, at the rear as viewed from the pickup 5. A further air distribution tray 13.2 having at least one further air passage 14.2 is provided between the second and third conveyor screw 8 as viewed from the pickup 5. The further air distribution tray 13.2 is connected to a further strand or portion of the air duct 12, in such a way that the airflow sucked in by the fan 9 is also passed to the further air distribution tray 13.2, as well as the first air distribution tray 13.1. The airflow is blown out diagonally counter to gravity and to the direction of travel F, in such a way that the crop A1 to be cleaned, which is accelerated by the further distributor 10.2, is transported onwards to engage with the third and fourth conveyor screw 8, at the rear as viewed from the pickup 5.

Figures 2, 3, 4:
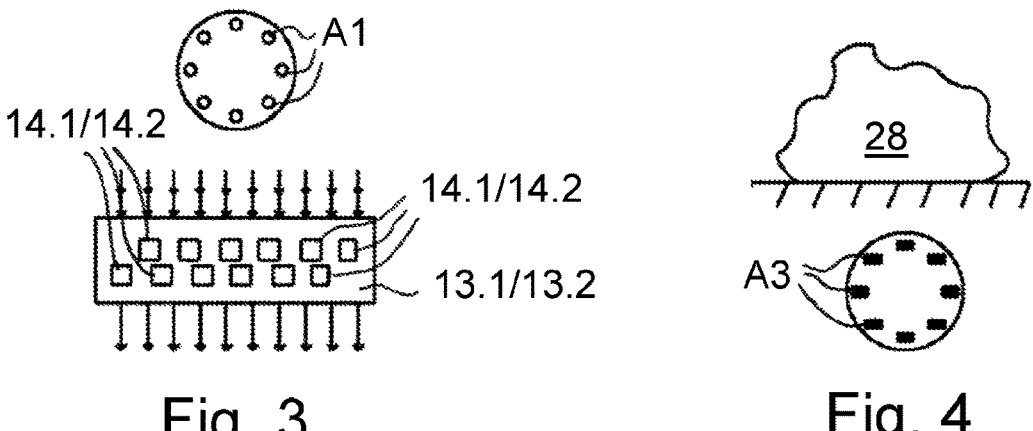
FIG. 2 is a schematic plan view of the agricultural mounted implement according to the invention according to FIG. 1, during operation at the rear of a vehicle.
FIG. 3 is a schematic plan view of an example of an air distribution tray for an agricultural mounted implement according to the invention.
FIG. 4 is a schematic side view of cleaned crops gathered as a swath.

FIG. 2 is a schematic plan view of the exemplary embodiment of the agricultural mounted implement 1 according to the invention according to FIG. 1, during operation at the rear of the vehicle 2. The mounted implement 1 is coupled to the rear lifting mechanism of the vehicle 2 via the upper link 16 and the two lower links 17.1, 17.2, and is connected to the auxiliary drive 19 of the vehicle 2 via the power transmission 20. The mounted implement 1 is also aligned centrally in relation to a vehicle longitudinal centre M of the vehicle 2. The pickup 5 is held in front of the conveyor screws 8 in the direction of travel F. Directional arrows indicate the material flow of the mown crop A1, lying on the ground, which is to be picked up by the pickup 5. The pickup 5, the fan 9 and the air duct 12 are shown in a plan view. The conveyor screws 8 and air distribution trays 13.1, 13.2 are shown in perspective. The conveyor screws convey the crop A1 to be cleaned transverse to the direction of travel F, resulting in it being cleaned in cooperation with the drop sieve 15 and being ejected from the cleaning unit 3.1, 3.2 as cleaned crop A3 on the ejection side 29, in such a way that the cleaned crop A3 is deposited on the ground in the form of swaths 28. A conveying direction of the conveyor screws 8 and an airflow direction of the airflow are indicated schematically by directional arrows.

FIG. 3 is a schematic plan view of an alternative exemplary embodiment of an air distribution tray 13.1, 13.2 for an agricultural mounted implement 1 according to the invention. The air distribution tray 13.1, 13.2 has a plurality of air passages 14.1, 14.2 of equal size, distributed in two rows over a longitudinal extension of the air distribution tray 13.1, 13.2. The material flow of the crop A1 to be cleaned through the air distribution tray 13.1, 13.2 is indicated by the drawn-in directional arrows.

FIG. 4 is a cross-sectional view of a swath 28 of the cleaned crop A3 ejected on the ejection side 29 by the mounted implement 1.

The functional components and operating principles described in FIG. 1 to 4 are largely transferrable to the exemplary embodiments described below of the agricultural mounted implement 1 according to the invention according to FIGS. 5 and 6.

Figure 5:
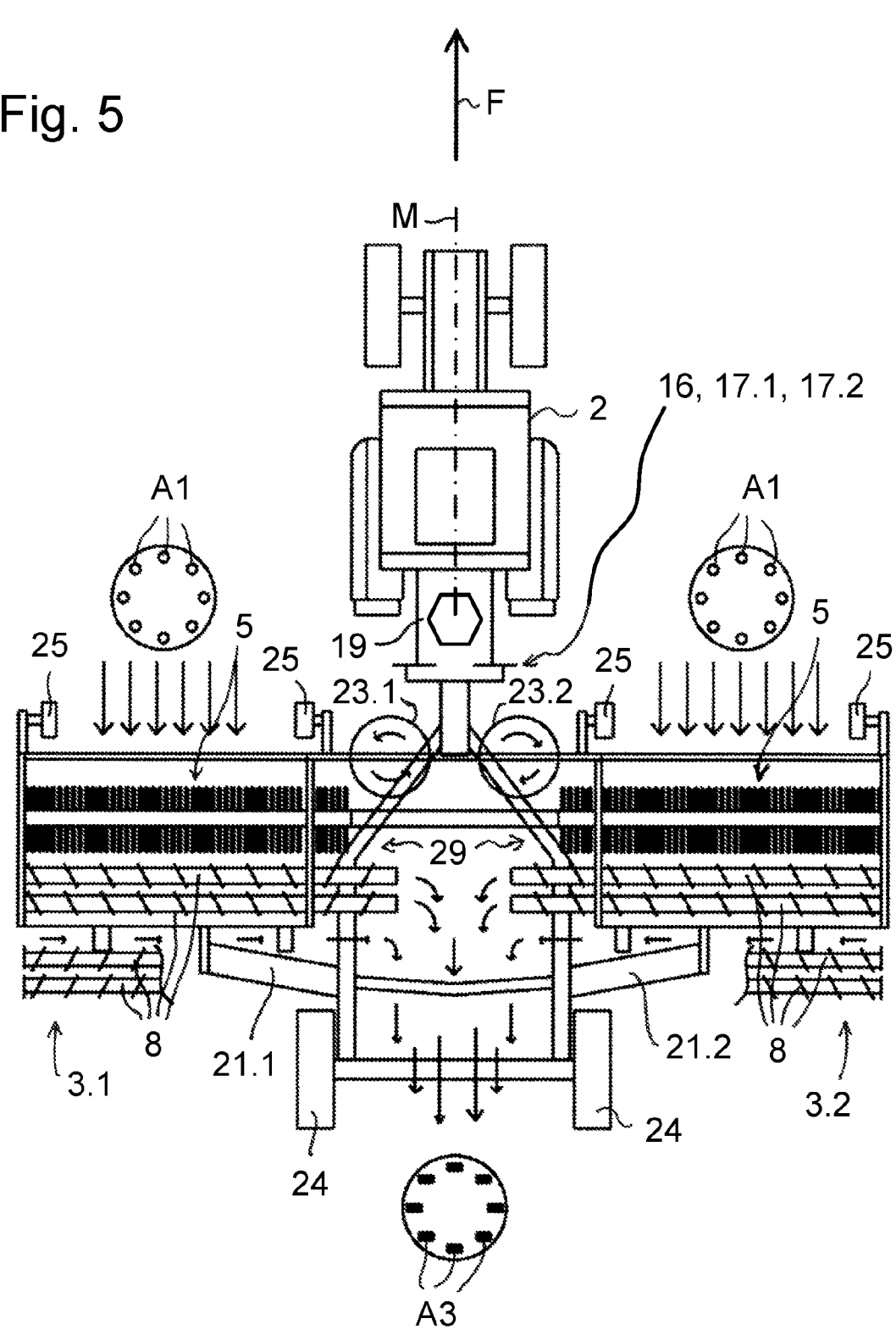
FIG. 5 is a schematic plan view of an example of an agricultural mounted implement according to the invention, during operation at the rear of a vehicle.

FIG. 5 is a schematic plan view of a second exemplary embodiment of the agricultural mounted implement 1 according to the invention. Here, the mounted implement 1 is shown during operation at the rear of the vehicle 2. As before, the mounted implement 1 is coupled to the lifting mechanism of the vehicle 2 via the links 16, 17.1, 17.2 and is operatively connected to the auxiliary drive 19 of the vehicle 2 via the power transmission 20. In this exemplary embodiment, the mounted implement 1 according to the invention comprises a first cleaning unit 3.1 and a second cleaning unit 3.2, which are configured as before. For simplicity, the air distribution trays 13.1, 13.2, the fan 9 and the air duct 12 are not shown. Here, the cleaning units 3.1, 3.2 are arranged at the same level in the direction of travel F of the vehicle 2, and their ejection sides 29 face one another and are spaced apart at equal distances from the longitudinal centre M of the vehicle. The four conveyor screws 8, some of which are only shown in part, are driven counter to one another, in such a way that the cleaned crop A3 is ejected onto the ground in a lined-up swath 28 at the level of the longitudinal centre M of the vehicle.

Counter-rotating free-clearing rotors 23.1, 23.2 are held on the mounting frame 4, in front of the two pickups 5 in the direction of travel F and flush with the rear tyres or a travel path of the vehicle 2. They are configured similarly to rotary rakes, and have a vertical rotational shaft having vertically extending rotary tines, which are held circumferentially thereon and which rake crop A1 to be cleaned which is passed over by the vehicle 2 into an engagement area of the pickup 5.

During non-operation, the cleaning units 3.1, 3.2 can be pivoted parallel to the direction of travel F into a compact non-operational position. For this purpose, pivotable extension arms 21.1, 21.2 are provided between the mounting frame 4 and the cleaning units 3.1, 3.2.

Figure 6:
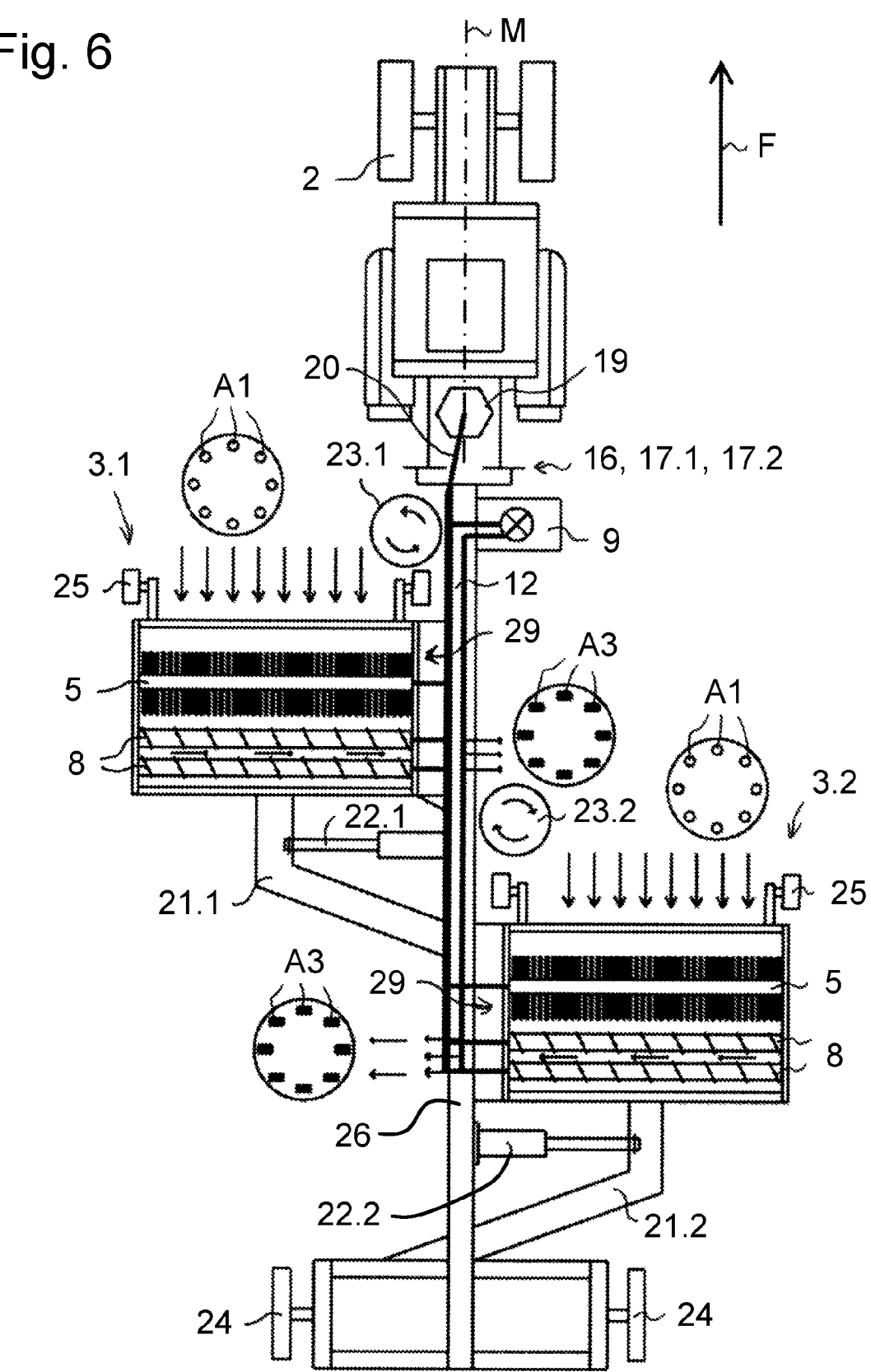
FIG. 6 is a schematic plan view of an exemple of an agricultural mounted implement according to the invention, during operation at the rear of a vehicle.

FIG. 6 is a schematic plan view of a third exemplary embodiment of the agricultural mounted implement 1 according to the invention, during operation at the rear of the vehicle 2. By contrast with the exemplary embodiment according to FIG. 5, the two cleaning units 3.1, 3.2 are held on the mounting frame 4 with an offset in level in the direction of travel F. The mounting frame 4 also has a central support beam 26, having a longitudinal extension flush with the longitudinal centre M of the vehicle. The extension arms 21.1, 21.2 can be pivoted via actuable hydraulic cylinders 22.1, 22.1, the operation of the hydraulic cylinders 22.1, 22.1 taking place via a hydraulic pump or on-board hydraulic system of the mounted implement 1, which is driven by the auxiliary drive 19 of the vehicle 2. As an alternative to the hydraulic cylinders 22.1, 22.2, electrical adjusting elements are also conceivable. Here, the air distribution trays 13.1, 13.2, are jointly supplied with the airflow via a central fan 9. For this purpose, the air duct 12 is configured with multiple strands in portions, and is fixed to the central support beam 26. Alternatively, it is also conceivable for the central support beam 26 of the mounting frame 4 to be configured, at least in portions, as a hollow profile body through which the airflow is passed. In this case, the central support beam 26 is also configured as the air duct 12.

The invention is not limited to the exemplary embodiments of the agricultural mounted implement 1 according to the invention which are shown in the drawings. In particular, the components may be provided in a different shape, number, dimensioning and relative arrangement.

For example, in an alternative exemplary embodiment of the agricultural mounted implement 1 according to the invention, it may be provided that the conveyor unit is formed by a belt rake having rows of belt rake tines, which are held on a belt driven transverse to the direction of travel F of the vehicle 2 during operation. As is conventional, the drop sieve 15 is provided below the conveyor unit, the drop sieve 15 being adapted to the contour of the belt rake.

In an alternative exemplary embodiment of the agricultural mounted implement 1 according to the invention, two or more pickups 5 are arranged coaxially side by side in the cleaning unit 3.1, 3.2. The width of the air distribution tray 13.1, 13.2 and conveyor unit is matched to the longitudinal extension of the pickups 5. This advantageously results in a particularly large working width for the agricultural mounted implement 1 even with a single cleaning unit 3.1, 3.2.

A further alternative exemplary embodiment of the agricultural mounted implement 1 according to the invention provides that the mounted implement 1 is configured for operation at the front of the vehicle 2. This means that the mounting frame 4 can be coupled to a front lifting mechanism of the vehicle 2. Accordingly, it is provided that, during operation, the components of the cleaning unit 3.1, 3.2 are held in front of a vehicle front of the vehicle 2 in the direction of travel F of the vehicle 2 (front operation). Front operation has the advantage that the crop A1 to be cleaned is protected from being run over by the tires of the vehicle 2. As a result, entry of raw ash into the crop A1 to be cleaned can be additionally reduced.

Alternatively, the agricultural mounted implement 1 according to the invention may be operated at the rear of the vehicle 2, in a conventional manner, another agricultural device which can be attached to the vehicle being operated at the front of the vehicle 2, for example an agricultural mounted implement 1 according to the invention, a mower or a windrower or tedder, for example comprising a belt windrower.

In an alternative exemplary embodiment of the invention, the agricultural mounted implement 1 has a bunker arranged below the air distribution tray 13.1, 13.2 and the drop sieve 15. The foreign particles falling through the air distribution tray 13.1, 13.2 or drop sieve 15 are received in the bunker, in such a way that the foreign particles are prevented from being returned to the ground.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An agricultural mounted implement for mobile cleaning of crops, performed on a vehicle, the implement comprising:

a mounting frame adapted to couple in a height adjustable manner to a front or rear lifting mechanism of the vehicle and which is supported on the lifting mechanism and/or on wheels standing on the ground;

a fan held on the mounting frame; and a cleaning unit held on the mounting frame, the cleaning unit comprising:

a pickup for picking up the crop to be cleaned;

a drum which, during operation, has a longitudinal extension transverse to a direction of travel of the vehicle and rotates, and which has a plurality of radially protruding tines held in an axially distributed manner;

a first air distribution tray that comprises a first air passage and which, during operation, is held on the mounting frame behind the pickup in a direction of travel and is connected to the fan via an air duct;

a conveyor unit which, during operation, is held on the mounting frame behind the first air distribution tray in the direction of travel, and which conveys transverse to the direction of travel, and via which the cleaned crop is adapted to be ejected from the cleaning unit towards an ejection side, and a drop sieve held congruently under the conveyor unit on the mounting frame, wherein, during operation, an airflow is sucked in by the fan, passed under the first air distribution tray and blown out counter to gravity through the first air passage such that the crop picked up by the pickup is transported onwards to the conveyor unit, and wherein the pickup and conveyor unit of the cleaning unit and the fan are driven, during operation, by an auxiliary drive of the vehicle.

2. The agricultural mounted implement according to claim 1, wherein, for coupling to a three-point power lift as the lifting mechanism of the vehicle, two lower links held together in a fork shape at the same height, and an upper link, held centrally above the lower links, are held on the mounting frame, and/or wherein the links have two or more vertically distributed through-holes for passing a connector through.

3. The agricultural mounted implement according to claim 1, wherein the cleaning unit comprises a first distributor held above the pickup and at a height between a drum axis of the drum of the pickup and the first air distribution tray, wherein the first distributor, during operation, has a shaft which rotates counter to the drum of the pickup and has distributor tines protruding radially therefrom and arranged in an axially distributed manner, and which, in use, is powered by the auxiliary drive of the vehicle.

4. The agricultural mounted implement according to claim 1, wherein the conveyor unit is a belt rake.

5. The agricultural mounted implement according to claim 1, wherein the conveyor unit is a conveyor screw.

6. The agricultural mounted implement according to claim 5, wherein the conveyor screw is mounted on a first screw end opposite the ejection side of the cleaning unit and is self-supporting on a second screw end opening into the ejection side.

7. The agricultural mounted implement according to claim 1, wherein the cleaning unit comprises two or more mutually parallel conveyor units or wherein, between the conveyor units, a further distributor rotating counter to the pickup and driven by the auxiliary drive of the vehicle is held above the conveyor units on the mounting frame.

8. The agricultural mounted implement according to claim 1, wherein the conveyor unit is one of a plurality of conveyor units, wherein at least one further air distribution tray, connected to the fan via the air duct and having a further air passage, is provided between the conveyor units such that, during operation, part of the airflow is blown out through the additional air passage.

9. The agricultural mounted implement according to claim 1, wherein a plurality of first air passages are provided in the first air passage tray and/or a plurality of further air passages are provided in the further air passage tray.

10. The agricultural mounted implement according to claim 1, wherein the drop sieve is channel-shaped and shaped in a manner corresponding to the conveyor unit at least in portions and/or in that a height between the drop sieve and the conveyor unit is adapted to be adjusted and/or wherein the drop sieve is formed with a finer sieve towards the ejection side.

11. The agricultural mounted implement according to claim 1, wherein the wheels of the mounting frame are held on the mounting frame so as to be height-adjustable and/or pivotable about a vertically orientated axis.

12. The agricultural mounted implement according to claim 1, wherein the mounted implement is coupled to the rear lifting mechanism of the vehicle and/or wherein two cleaning units are included.

13. The agricultural mounted implement according to claim 12, wherein the cleaning units are each pivotably held on the mounting frame via a telescopic or pivotable extension arm and/or an adjustment element, which is held between the extension arm and the mounting frame and driven by the auxiliary drive of the vehicle, such that the drum of the pickup and the conveyor unit are pivoted out into an operating position transverse to the direction of travel during operation and are pivoted into a non-operating position parallel to the direction of travel during non-operation.

14. The agricultural mounted implement according to claim 13, wherein the adjusting element is a hydraulic cylinder operated by means of a hydraulic pump operated by the auxiliary drive of the vehicle.

15. The agricultural mounted implement according to claim 12, wherein, during operation, the cleaning units are held side by side on the mounting frame at the same level in the direction of travel.

16. The agricultural mounted implement according to claim 12, wherein, during operation, the conveyor units of the cleaning units are driven counter to one another and the ejection sides of the cleaning units are at equal distances from a vehicle longitudinal centre of the vehicle such that the cleaned crop is ejected at the level of the longitudinal centre of the vehicle.

17. The agricultural mounted implement according to claim 12, wherein two free-clearing rotors having a vertically orientated rotor axis and vertically orientated rotor tines, which are close to the ground during operation, are held on the mounting frame, the free-clearing rotors, during operation, being arranged in front of the pickup and flush with the rear wheels of the vehicle in the direction of travel, and are driven in a counter-rotating manner via the auxiliary drive of the vehicle such that crop passed over by the vehicle is brought in front of the pickups of the cleaning units transverse to the direction of travel.

18. The agricultural mounted implement according to claim 12, wherein each cleaning unit is assigned a fan and an air duct and/or wherein a single fan is included, the air duct in any case being formed with two strands in portions such that air sucked in during operation is passed to both cleaning units.

19. The agricultural mounted implement according to claim 1, wherein, during operation, the cleaning units are held on the mounting frame offset from one another in the direction of travel, the mounting frame having an elongate central support beam held centrally between the cleaning units.

20. The agricultural mounted implement according to claim 1, further comprising a distributor gear which is held on the mounting frame and which is connected to the auxiliary drive of the vehicle via a cardan shaft, and/or wherein an output torque of the distributor gear is distributed via a power transmission configured as belts and/or belt pulleys and/or chains and/or gear wheels and/or additional gears, to the components of the mounted implement which are to be driven.

\* \* \* \* \*